United States Patent [19]

Deitrich, Sr.

[11] 4,265,465
[45] May 5, 1981

[54] TRAILER BUMPER HITCH

[75] Inventor: William J. Deitrich, Sr., Congerville, Ill.

[73] Assignee: DMI, Inc., Goodfield, Ill.

[21] Appl. No.: 67,468

[22] Filed: Aug. 17, 1979

[51] Int. Cl.$^3$ .............................. B60D 1/14; F16G 7/10
[52] U.S. Cl. ................................ 280/478 A; 267/138; 280/484; 280/487
[58] Field of Search ............... 280/478 A, 478 R, 487, 280/486, 484, 483, 482; 267/70, 169, 138

[56] References Cited

U.S. PATENT DOCUMENTS

| | | | |
|---|---|---|---|
| 1,884,323 | 10/1932 | Snow, Jr. | 280/490 R |
| 2,357,611 | 9/1944 | Shields | 267/138 |
| 3,126,210 | 3/1964 | Hill | 280/478 A |
| 3,140,881 | 7/1964 | Antici | 280/478 A |
| 4,027,893 | 6/1977 | Drudge | 280/487 |

Primary Examiner—John J. Love
Assistant Examiner—Donn McGiehan
Attorney, Agent, or Firm—Emrich, Root, Lee, Brown & Hill

[57] ABSTRACT

A spring assembly is carried by a mounting casting. The mounting casting includes a receptacle which is adapted to mount to a horizontal frame member by means of a vertical bolt which, when tightened, adjusts the elevation of the spring assembly by rotating the mounting casting about the frame member due to a shim effect achieved by the slight off-parallel alignment of the receptacle and the axes of the springs. This raises the spring assembly to take its weight off the draw bar and makes it easier to telescope the draw bar. A spring casting includes upper dogs for mounting an actuating lever which is rotatable between a latching and an unlatched position by vertical motion. A latch member on the draw bar is locked between the spring casting and the lever, but is released when the lever is lowered to permit the draw bar to be extended to the rear for alignment with a trailer hitch. Other improvements permit the use of coil springs without grinding the ends flat.

8 Claims, 7 Drawing Figures

U.S. Patent   May 5, 1981   Sheet 1 of 2   4,265,465
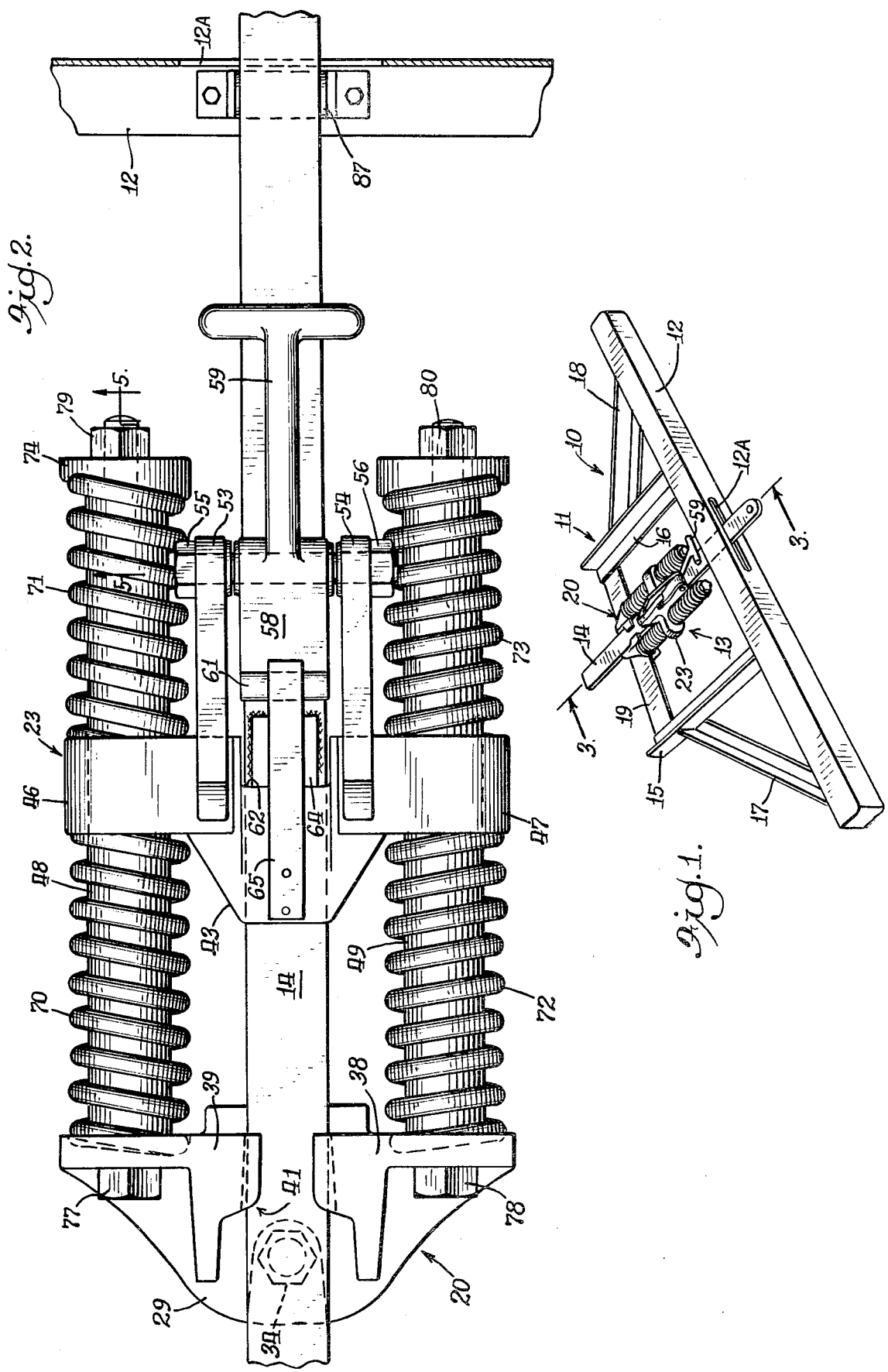

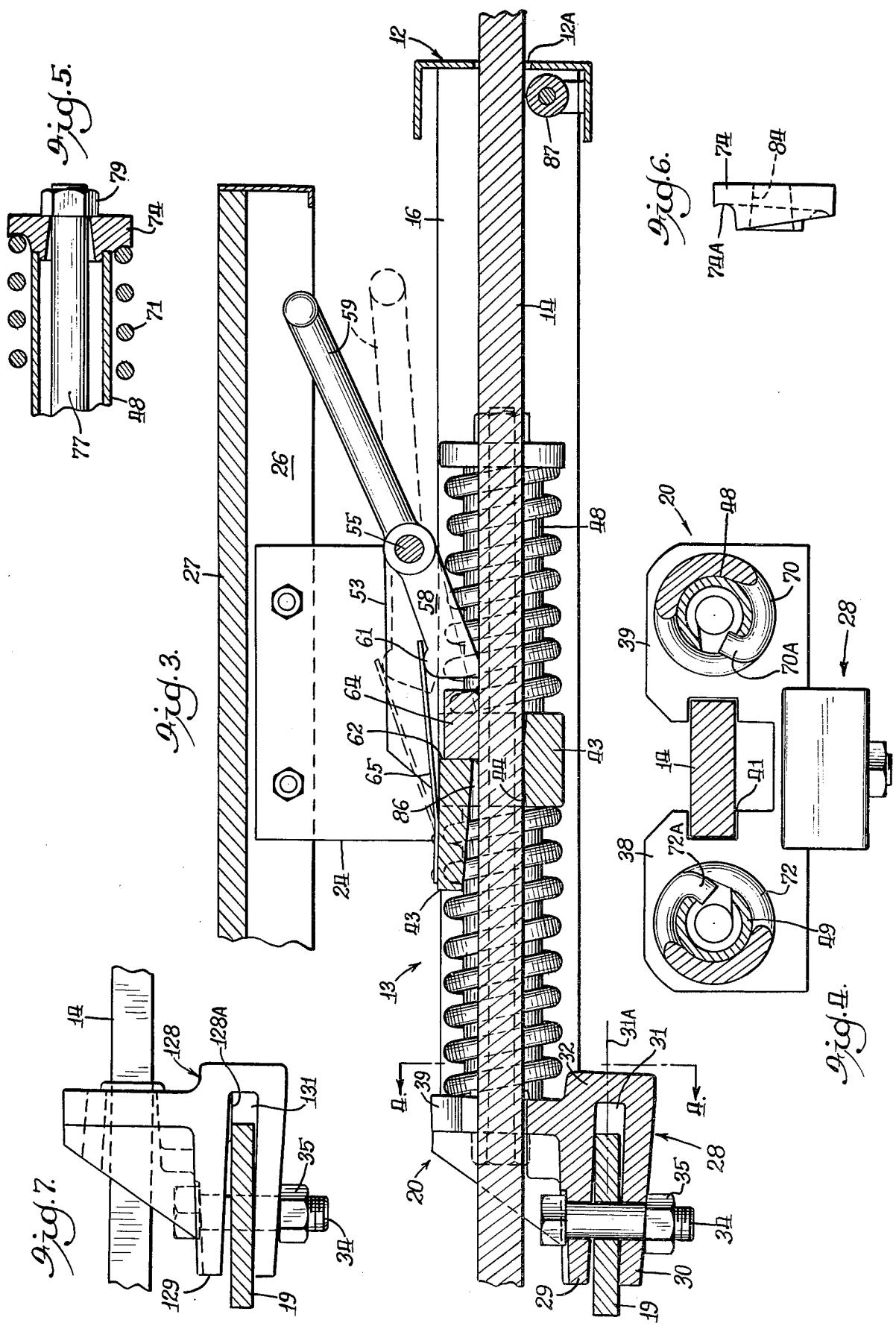

TRAILER BUMPER HITCH

BACKGROUND AND SUMMARY

The present invention relates to improvements in a trailer bumper hitch; and more particularly, the improvements relate to the hitch disclosed in the Antici U.S. Pat. No. 3,140,881, issued July 14, 1964. This patent discloses a trailer hitch which makes it easier to attach the draw bar to the trailer by two release mechanisms. One of these release mechanisms permits the draw bar to be moved longitudinally toward the rear when the release is actuated so that it can be aligned with the hitch of the trailer, and the other release mechanism permits the draw bar to be swung laterally in any rearwardly extended position—thus greatly increasing the range over which the draw bar can be connected to the trailer without further moving either vehicle. This trailer hitch has the further advantage that no special maneuvering is required to reset both release mechanisms. When the towing vehicle turns, the lateral release mechanism is reset, and when the towing vehicle brakes or slows down, the longitudinal release mechanism is reset. Further, both releases and reset mechanisms operate independently of each other. This trailer hitch has provided substantial convenience to users, particularly in the agricultural industry where trailer loads may be quite heavy, and the terrain at which it is desired to hitch a trailer to the towing vehicle may be rough or uneven.

Despite the substantial convenience of this bumper hitch and its commercial success, there are two relatively minor aspects in the commercial version of the hitch which proved to be slight inconveniences to the user. Even though they were slight, however, it must be realized that the primary purpose of the hitch is to provide convenience to the user. Hence, even slight inconveniences might have an impact in original or re-sale of a hitch.

The first inconvenience is the actuation of the longitudinal release mechanism for the draw bar. It included a pin which had to be aligned with a vertical aperture in the draw bar in the reset position. Although the original Antici patent disclosed in one embodiment an actuating lever for this release pin which was located beneath the floorboards of the truck on which the hitch is mounted and above the hitch itself, nevertheless, this proved to be impractical and was not incorporated into the commercial version. Rather, in the commercial version, the longitudinal release mechanism included a lever located beneath the hitch mechanism for withdrawing the longitudinal locking pin to permit the draw bar to be pulled to the rear. This arrangement had the disadvantage that because it was placed beneath the hitch, which itself is mounted beneath the bed of a vehicle such as a pick-up truck, it was possible to break or bend this handle or lever by passing over a log or stump or the like. Still further, it was somewhat inconvenient to reach and actuate.

Another disadvantage in the commercial version of the hitch is that even though the longitudinal release mechanism for the draw bar were actuated, it sometimes became difficult to pull the draw bar longitudinally to align it with the hitch of the trailer. The reason for this, it was found, after studying the problem, is that whereas the front and rear of the draw bar were supported, the entire spring assembly which cushioned the draft forces rests on the middle of the bar. Because this is a heavy duty structure, the weight of the spring assembly is as much as thirty pounds, and it is the binding action of the weight of the spring assembly which in some instances made it difficult to withdraw the draw bar even though the longitudinal release mechanism is actuated.

The present invention, then, is directed to improvements in overcoming the above operational problem, and in further providing advantages in manufacturing which effect production cost reductions.

According to the present invention a clevis-type of receptacle is formed integrally with the spring assembly mounting casting, and it is adapted to mount to a horizontal member of the hitch frame by means of a vertical threaded fastener such as a bolt which, when tightened, adjusts the elevation of the spring assembly by rotating it about the horizontal frame member. A shim effect is achieved by a slight off-parallel alignment of the clevis-type receptacle and the axes of the spring assembly. This permits the spring assembly to be elevated about the draw bar and makes it easier to telescope the draw bar when the spring assembly is thus cantilevered relative to the horizontal frame member and does not rest on the draw bar.

Further, the spring casting includes a pair of upper dogs for mounting an actuating lever between a latching and an unlatched position by moving the lever downwardly. The lever is located between the bed of the towing vehicle and the hitch spring assembly. A latch member is provided on top of the draw bar and it is locked between the spring casting and the lever to lock the draw bar longitudinally. The draw bar is released when the lever is lowered to permit the latch member to be extended beneath the lever toward the rear, for alignment with a trailer hitch.

To reduce manufacturing costs, the four springs included in the spring assembly for cushioning the draft forces are provided with conforming seating surfaces both in the spring assembly mounting casting and the spring center casting, as well as in the spring end clamp members. The ends of all four springs which are remote from the center casting are turned radially inwardly and clamped by means of the spacer tube to the outboard ends of the assembly, which spacer tubes are received within the springs.

Other features and advantages of the present invention will be apparent from the following detailed description of a preferred embodiment accompanied by the attached drawing wherein identical reference numerals will refer to like parts in the various views.

THE DRAWING

FIG. 1 is a perspective view of the improved bumper hitch assembly taken from the upper left side thereof;

FIG. 2 is a plan view of the spring assembly of the hitch of FIG. 1;

FIG. 3 is a left side view of the apparatus of FIG. 2 showing the bed of the truck in fragmentary form;

FIG. 4 is a vertical cross sectional view taken through the sight line 4—4 of FIG. 3 and showing a rear view of the spring assembly mounting casting;

FIG. 5 is a close up fragmentary vertical cross sectional view taken through the sight line 5—5 of FIG. 2 showing the contoured spring end caps or seats;

FIG. 6 is a side elevational view of a spring end cap; and

FIG. 7 is a side view of an alternate form of spring assembly mounting casting.

DETAILED DESCRIPTION

Referring first to FIG. 1, reference numeral 10 generally designates a complete trailer bumper hitch according to the present invention. In general, it may be said to comprise a frame generally designated 11, a rear bumper 12, a spring assembly 13 and a draw bar 14.

Turning first to the frame 10, it includes first and second angle members 15, 16 which are welded to the bumper 12 and extend in the direction of travel of the vehicle. These members are braced by inclined angle members 17, 18, and a horizontal frame member 19, in the form of a flat steel bar is welded to the forward ends of the longitudinal frame members 15, 16.

The spring assembly 13 is mounted to the horizontal frame member 19 by means of a spring assembly mounting casting generally designated 20 in FIGS. 2, 3 and 4.

The draw bar 14 extends through a slot 12A in the bumper 12 for attachment to the trailer, and the draw bar extends longitudinally through a spring center casting 23 and the spring assembly mounting casting 20, and it is guided by both members as will be described.

Turning now to FIGS. 2 and 3, the bumper hitch is mounted beneath the bed of a truck, for example, by a pair of mounting brackets, one of which is shown in FIG. 3 and designated 24. It is mounted to a support member 26 for the deck boards 27 of the bed of the towing vehicle, in a conventional manner.

Turning now to the spring assembly mounting casting 20, it includes a lower mounting portion 28 including upper and lower flanges 29, 30 which are spaced to define a receptacle 31 for the horizontal frame member 19. The upper and lower members 29, 30 are joined by a wall 32 to form a clevis-type of mount to the horizontal frame member 19. A threaded fastener including a bolt 34 and a nut 35 extend through the upper and lower walls 29, 30 and the horizontal frame member 19, as best seen in FIG. 3 for mounting the casting 20 to the frame member 19. The axis of the receptacle 31 is illustrated at 31A, and it is inclined at a slight angle relative to the longitudinal axis of the springs to be described or the draw bar 14. In other words, the included angle between the axis 31A (actually, it is a plane) and the vertical is slightly less than 90° in the untightened position. The casting 20 includes a pair of upright spring bearing walls 38, 39, best seen in FIG. 4; and when the nut 35 is tightened on the bolt 34, the axis 31A of the receptacle 31 is rotated counterclockwise in FIG. 3, thereby causing the bearing walls 38, 39 to form an angle of about 1° with the vertical, and raising the entire spring assembly 13 relative to the draw bar 14. The draw bar 14 is received and freely slidable within the passage 41 (see FIG. 4) formed in the spring assembly mounting casting 20 between the spring bearing wall 38, 39.

Turning now to the spring center casting 23, it includes a center body portion 43 which also slidably receives the draw bar 14 as seen in FIG. 3 through an aperture 44. Extending laterally of the center body portion 43 are first and second side bosses 46, 47 which are apertured to receive spring spacer sleeves or tubes 48, 49 respectively.

Extending upwardly and rearwardly of the center body portion 43 of the spring center casting 23 are first and second dogs 53, 54 which are spaced laterally as seen in FIG. 2 and apertured to receive a bolt 55 which is secured by means of a nut 56 and acts as an axle for an actuating lever generally designated 58. The lever 58 includes a handle 59 which, as can be seen from FIGS. 1 and 3, is located above the draw bar 14 and beneath the deck of the towing vehicle.

The main body of the casting 58 extends forwardly of the axle provided by the bolt 55 and defines a nose portion 61 which is spaced rearwardly of a surface 62 on the main body portion 43 of the casting 23 to receive a latch member 64 in the form of a steel block which is welded to the top of the draw bar 14.

A flat steel spring 65 is secured to the top of the central body portion 43 of the casting 23 to urge the nose 61 of the lever 58 downwardly so as to lock the latch member 64 between the nose 61 and the surface 62, just described. The draw bar may be released, however, by moving the handle 59 of the lever 58 downwardly to the dashed position shown in FIG. 3 against the bias of the spring 65, thereby permitting the latch member 64 to move freely beneath the lever 58 rearwardly of the center spring casting 23.

There are four separate springs 70, 71, 72 and 73 in the spring assembly. The springs 70 and 71 are supported by the spacer tube 48, and the springs 72, 73 are supported by the spacer tube 49. The springs 70 and 72 are located between the bearing walls 38, 39 of the mounting casting 20 and the spring center casting 23. The springs 71, 73 are located between the center casting 23 and contoured end caps 74, 75 respectively. A pair of elongated bolts 77, 78 extend through the bearing walls 39, 38 of the mounting casting and the centers of the spacer tubes 48, 49 respectively, and are secured by nuts 79, 80 bearing against the outboard ends of the spring end caps 74, 75. These bolts, when their respective nuts are tightened, cantilever the springs, the spacer tubes and the central spring casting 23 as well as the actuating lever 59 from the mounting casting 20. Hence, when the nut 35 is tightened on the bolt 34, as described above, the entire spring assembly is rotated counterclockwise in FIG. 3 to raise the center casting above the draw bar 14 and thereby create a space designated 86 in FIG. 3 between the center body portion 43 of the center casting 23 and the draw bar 14 so that the draw bar may be freely moved longitudinally when the release mechanism is actuated by lowering the lever 59, as described. It will be appreciated that the draw bar is at least partially supported by a rear roller 87 which, as best seen in FIG. 3, is mounted beneath the draw bar on the rear bumper 12.

The seating surfaces for the springs are all contoured to the shape of the springs. That is, the surfaces on the bearing walls 38, 39 of the mounting casting 20 as well as the four surfaces on the center casting 23 and the inner surfaces of the end caps 74, 75 are all contoured to the shape of the respective springs. In addition, the surfaces on the bearing walls 38, 39 and the end caps 74, 75 are further contoured to receive inwardly-turned ends of the springs, such as those designated 72A and 70A for the springs 72 and 70 respectively, as seen in FIG. 4. These inwardly-turned end portions of the spring are also formed on the ends of the springs 71 and 73 which are seated on the end caps 74 and 75. Thus, the outboard ends of the spacer tubes 48, 49 engage these inwardly-turned spring ends to hold the respective springs against either the mounting casting or the end caps so that when the center casting moves in response to draft forces, it is free to move relative to the inboard ends of the springs, but the springs which are not compressed do not lose their seating orientations. This has the advantage that the ends of the springs do not have to be ground during manufacture, which is a time-consuming and expensive manufacturing operation.

Turning now to FIGS. 5 and 6, the end cap 74 is seen to be formed into a contoured surface 74A for receiving the end of the spring 71, and a central bore 84 of frustoconical shape is formed to receive the bolt 77. The opening 84 widens toward the center casting 23 to permit the bolt 77 to move slightly in response to draw bar forces without binding.

Turning now to FIG. 7, an alternative form of the mounting casting 28 is designated 128, and it is similar to the spring assembly mounting casting 28, already described, except that a land member 128A is formed toward the rear of the under surface of the top portion 129 of the clevis-type mount. The 128A is placed to engage the upper surface of the horizontal frame member 19 to add further shim effect to the mounting casting 128 when the nut 35 is tightened on the bolt 34. In this case, the axis of the receptacle 131 of the mount need not be inclined relative to the horizontal as in the embodiment of FIG. 3, although it may be slightly inclined, because the tightening of the bolt will nevertheless achieve sufficient rotation of the upper portion of the casting 128 to reduce substantially the weight of the spring assembly and casting resting on the draw bar, and thereby free it from binding.

Mounts other than the clevis-types which have been disclosed could be designed to work equally well in elevating the spring assembly and center casting relative to the draw bar by tightening a threaded fastener, as one part of the invention is viewed in its broader aspects. For example, the spring assembly mounting casting could have a general L-shape with a horizontal flange being of the shape of flange 30 of FIG. 3 and sandwiched between two horizontal bars such as 19. A bolt extending through all three elements would, when tightened, cause the vertical flange of the L-shaped casting (to which the springs are directly mounted) to rotate counterclockwise as viewed in FIG. 3 and thereby elevate the spring assembly and center casting or member relative to the draw bar.

The operation of the apparatus will be appreciated by persons skilled in the art from the detailed description given above which contains comments on the operation, as appropriate. However, it will be understood that the actuator for the longitudinal locking mechanism for the draw bar 14 is located between the draw bar and the bed of the truck or vehicle to which it is mounted so that it cannot be damaged in transit. Further, it is conveniently located for actuation by a user, simply by placing a hand beneath the bed of the vehicle and turning the lever 58 clockwise as seen in FIG. 3. The latch member 64 is seated against the surface 62 of the center casting 23 as the vehicle brakes or slows down and the draw bar 14 is forced forwardly because the latch member 64 rides beneath the lever 58 against the action of the flat steel spring 65, and once the latch member 64 rides forwardly of the nose 61 on the lever 58, the lever will return to its latching position and the latch member 64 will be locked in the position shown in FIG. 3.

The mounting of the spring assembly 13 and center casting 23, and the adjustment of the spring mounting casting so as to raise the spring assembly relative to the draw bar to facilitate removal of the draw bar have already been described, as well as have been the improved mounting and securing of the springs themselves.

Having thus disclosed in detail a preferred embodiment of the invention as well as alternative embodiments of the mounting casting, persons skilled in the art will be able to modify certain of the structure which has been disclosed and to substitute equivalent elements for those illustrated while continuing to practice the principle of the invention; and it is, therefore, intended that all of such modifications and substitutions be covered as they are embraced within the spirit and scope of the appended claims.

I claim:

1. In a trailer hitch apparatus including a mounting frame adapted to mount the apparatus beneath a towing vehicle including horizontal frame means, and further including a draw bar, a movable member releasably securable to and receiving said draw bar for moving longitudinally of the axis of said draw bar when secured to said draw bar, and spring means carried with said member for urging said member to a rest position and for cushioning draw bar forces, the improvement comprising mounting means for mounting said spring means and said member carried therewith to said horizontal frame means including at least one horizontal element adapted to be assembled to said horizontal frame means; fastener means for securing said element to said frame means; said mounting means including receptacle means at least partially defined by said horizontal element and adapted to receive said horizontal frame means for mounting said spring means and said movable member to said horizontal frame means in such a manner that as said fastener means is tightened to secure said element to said horizontal frame means, said spring means and said movable member are raised relative to said draw bar.

2. The apparatus of claim 1 wherein said spring means comprises a plurality of springs having generaly horizontal axes and mounted to bias said movable member in a latched position, said mounting means including a clevis-type mount providing said receptacle means, said receptacle means defining a generally horizontal axis which is slightly off-parallel relative to the axes of said spring means to raise said spring means relative to said horizontal frame means when said fastener means is tightened.

3. The apparatus of claim 2 wherein said horizontal frame means comprises a bar and said mounting means includes a casting defining upper and lower flange members for receiving said bar, said casting further providing first and second upright bearing walls adapted for mounting said spring assembly thereto.

4. The apparatus of claim 1 wherein said movable member comprises a second casting having springs acting against opposing sides thereof and defining a central aperture receiving said draw bar and providing a bearing surface, said draw bar including a latch member adapted to engage said bearing surface when said draw bar is moved forwardly, said second casting further including a lever adapted for rotation about a horizontal axis, said lever including a forward portion spaced from said bearing surface an amount sufficient to receive the latch member of said draw bar to lock the same in the latched position.

5. The apparatus of claim 4 wherein said latch member of said draw bar extends above said draw bar and the axis of rotation of said lever is above said draw bar.

6. The apparatus of claim 5 wherein said lever defines a rearwardly, upwardly extending handle located beneath the deck of a vehicle to which said apparatus is mounted; and second spring means for biasing said handle to the upper position, whereby when said handle is lowered, the forward portion thereof is raised above the latch member of said draw bar to free said draw bar to be moved rearwardly beneath said lever for extension to attach to the hitch of a trailer.

7. The apparatus of claim 1 wherein said spring means includes at least first and second helical compression springs mounted respectively to either side of said movable member and preloaded against the same; a spacer extending through said center member and said springs; a generally vertical bearing wall on said mounting means for receiving the outboard end of one of said springs and an end cap receiving the outboard end of the other of said springs relative to said movable member; and a bolt for securing said end cap and spacer member and springs to said mounting means, the further improvement characterized in that the spring-bearing surfaces of said movable member are helically contoured to the shape of said spring, the outboard ends of said springs being turned inwardly, the bearing surfaces of said mounting member and said end cap also being helically contoured to receive said springs and the inwardly turned ends thereof, said central tubular member trapping the inwardly turned ends of said springs to said mounting means and said end cap respectively so that said movable member may move in response to draw bar forces without unseating said springs from their respective bearing surfaces.

8. In a trailer hitch apparatus including a mounting frame adapted to mount the apparatus beneath a towing vehicle, a draw bar, a movable member receiving said draw bar, and spring means for urging said movable member to a rest position, improved means for releasably securing said draw bar to said movable member characterized in that said movable member comprises a casting defining a central aperture receiving said draw bar and providing a generally vertical bearing surface, and that said draw bar includes a solid latch member adapted to engage said bearing surface when said draw bar is moved forwardly, a lever mounted to said casting for rotation about a horizontal axis, means for biasing said lever to a locking position but permitting hand motion to move said lever to an unlocked position, said lever including a portion spaced from said bearing surface axially of said draw bar an amount sufficient to receive the latch member of said draw bar to lock the same when said lever is in the locked position, but permitting said draw bar to be moved axially when said lever is moved to the unlocked position.

* * * * *